United States Patent Office 2,782,196
Patented Feb. 19, 1957

2,782,196

METHOD OF HALOGENATING THIOUREA DIACETONE ALCOHOL DERIVATIVES

Mortimer T. Harvey, South Orange, N. J., assignor to Harvel Research Corporation, a corporation of New Jersey No Drawing. Application December 28, 1953, Serial No. 400,814

8 Claims. (Cl. 260—251)

This invention relates to novel reaction products, and to methods for producing them and also to novel compositions of matter in which certain compounds may be a component.

According to this invention in one of its more specific aspects, thiourea is reacted with diacetone alcohol in the mole ratio of 1 to 1 in order to provide a novel reaction product which when in purified condition is a white crystalline material or compound soluble in a 50% aqueous solution of alcohol. In general, the reaction may take place in the presence of an acidic agent or catalyst which may be a mineral acid, example of which is hydrochloric acid. In another of its more specific aspects the invention is directed to a number of different series of derivatives of said novel reaction product of thiourea and diacetone alcohol, and is directed especially to the halogenated derivatives of said novel reaction product and of said reaction product after hydrogenation.

In one of its specific aspects the thiourea may be reacted with diacetone alcohol while slowly adding with constant stirring to a mixture thereof an acidic agent such as dry hydrochloric acid. Dry hydrochloric acid is employed because no external heating is required for the reaction to take place, the time required for the reaction is comparatively short and very high yields of the reaction product are produced. The reaction drying the hydrochloric acid addition is exothermic and may go up to 80° C. The quantity of dry hydrochloric acid added during the reaction may vary and its addition is terminated when the mass becomes a homogeneous solution. After the last increment of dry hydrochloric acid has been added and a substantially homogeneous solution has been obtained, the mass is allowed to stand at room temperature for a period of 12 to 24 hours. At the end of that period, the mass is neutralized with a weak solution of caustic and then sufficient water, approximately 1 to 2 volumes, is added thereto and the mass is filtered. The filter cake is added to another volume of water and stirred, and this mass is again filtered. This may be done one or more additional times to remove the soluble chlorides from the solid material which is of a crystalline nature. Further purification and recrystallization is effected by dissolving the solid mass in a hot 50% aqueous solution of alcohol which is then filtered; the filtrate is cooled, whereupon crystallization occurs overnight. These crystals may be further treated in the same manner and recrystallized any number of times, generally two or three other times is sufficient, so that there is obtained a substantially chemically pure product composed of carbon, hydrogen, nitrogen and sulphur. The crystalline thiourea-diacetone alcohol reaction product contains approximately 54% carbon, 18% nitrogen, 8% hydrogen and 20% sulphur, and has the following empirical formula: $C_7H_{12}N_2S$ and in its purified state normally is a white crystalline material which is substantially insoluble in cold water and is soluble in a hot 50% aqueous solution of alcohol, and has a melting point of approximately 246.5°–247.5° C. uncorrected.

The purified crystalline material as well as the reaction product before purification takes place may be hydrogenated to saturate it apparently at its nitrogen double bond. They may also be oxidized to produce various derivatives. They may be treated to convert one or more of the trivalent nitrogens therein to the pentavalent state. They, as well as the hydrogenated derivatives thereof, may be halogenated to provide novel halogenated derivatives. These halogen derivatives may be treated with cyanides to replace the halogens with CN groups and these compounds having such CN groups present may, if desired, be hydrolyzed to convert the CN groups to COOH groups and then, if desired, the metal salts of these acids may be obtained, such as cobalt, nickel, copper, manganese, etc. or if desired the COOH groups may be esterified to replace the H of the COOH groups with an organic group, such as $CH_3$, $C_2H_5$, etc. They may be orally administered to animals, examples of which are cattle, sheep, fur bearing animals such as fox, mink, skunk, etc. and also to poultry, to enhance certain of their qualities and characteristics, and sometimes may serve as therapeutic agents therefor. In addition they may be employed as plant foods. I believe that they behave in the nature of growth stimulants and in the animal kingdom appear to produce an effect in the nature of those sometimes produced by vitamins. They may be given to the various animals by oral administration or they may be used as additives in normal diet. Such vehicles of administration should contain enough of the additives so that it will be ingested in the course of fulfilling the daily food requirement. They may be dispersed or otherwise combined with the drinking water or any other liquid constituents of the animal diet such as milk, etc. The animal feed or diet with which they may be combined of course varies in its composition depending on the particular class of animals to be fed. In most cases the quantity of the reaction product employed in the feed is small and generally less than 10% by weight and preferably between .001 and 1%. If desired, the novel crystalline reaction product of this invention may be mixed as a solid directly into the feed or it may be dissolved in hot alcohol-water solvent and the resultant solution may be dispersed or in any other convenient manner combined with the normal feed.

It may be dispersed to any of the edible oils such as coconut, olive, cottonseed or the like, and the resultant mixture may be dispersed in the solid particles of the feed. Any of the commercial or "farm mix" feeds may be employed as carriers of these compounds.

The feeds to which compounds are to be added in general contain a quantity of grains. Sometimes they are in the form of ground meat or other proteins together with minerals and vitamins sufficient to furnish adequate diet to suit the requirements of the animals to be fed.

In addition, the novel reaction product of this invention finds use in the making of insecticides; fertilizers; vulcanizers for rubber, both natural and synthetic; color stabilizers for vinyl compounds, etc.

The following is a specific example given merely for the purpose of illustrating a method for producing the novel chemical compound of the present invention, all parts being given by weight unless otherwise specified.

Example 1

76 grams of thiourea and 174 grams of diacetone alcohol were placed in a glass reacting vessel. Then over a period of approximately 20 minutes, while the mass was being constantly stirred, there was slowly and uniformly bubbled therein, dry hydrochloric acid while the temperature of the mass rose and was maintained at about 70° to 80° C. The addition of the hydrochloric acid was stopped when a homogeneous solution was obtained at the end of that period.

The mass was allowed to stand overnight. The next morning it was neutralized with a weak solution of caustic and then diluted with an equal volume of water and then filtered. The filter cake was placed in another volume of water and stirred to dissolve the chlorides and then filtered. The resultant filter cake which was crystalline was recrystallized by being dissolved in a hot 50% aqueous solution of alcohol. The hot solution was filtered. The filtrate was allowed to stand overnight, whereupon crystallization occurred. The mass was filtered and recrystallized in the same manner and then dried at room temperature to provide a substantially chemically pure white crystalline product substantially insoluble in cold water and soluble in a hot 50% aqueous solution of alcohol and hereinafter known as Product A. The crystalline product I believe has the following probable structural formula and showed the following analysis compared with theoretical as set forth in the table:

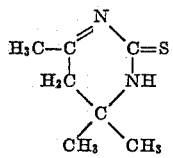

|  | Theoretical, percent | Found, percent |
|---|---|---|
| Carbon | 53.9 | 54.25 |
| Hydrogen | 7.7 | 8.10 |
| Nitrogen | 17.9 | 17.5 |
| Sulphur | 20.5 | 19.5 |

The white crystalline reaction product of Example 1, either in its purified or unpurified condition, may be hydrogenated to combine a mole of hydrogen with each mole of said reaction product. This hydrogenation may be accomplished by first dissolving said reaction product in alcohol to provide a 20% solution by weight. To said solution is added a quantity of platinum catalyst in an amount equal to approximately .5 part by weight of catalyst to 100 parts by weight of said reaction product in said solution. Then to said solution carrying the catalyst is added hydrogen at 100 lbs. per sq. in. pressure while agitating the mass and maintaining it at a temperature of approximately 100° C. The free hydrogen which is maintained in contact with said mass under those conditions is continuously admitted thereto and such addition is stoped when no more hydrogen is taken up and the resulting hydrogenated product, after removal of the alcohol solvent, will be found to have the following empirical formula: $C_7H_{14}N_2S$.

The white crystalline reaction product of Example 1, either in its purified or unpurified condition, may be oxidized to provide still other derivatives thereof. This may be accomplished by dissolving a quantity of said reaction product in alcohol to provide a 5%–10% solution thereof. Then to said solution is added a 30% aqueous solution of hydrogen peroxide. The amount of said aqueous solution of hydrogen peroxide added is equal to 1–5 times the quantity by weight of the reaction product in said alcohol solution. Subsequently the entire mass is first stirred and then allowed to stand for about 4 days at room temperature or, if desired, external heat may be employed to hasten the reaction. At the end of the 4 day period the mass is placed in shallow open dishes to allow most of the alcohol to evaporate off and the solid white mass in the dishes is filtered and dried at room temperature.

The white crystalline reaction product of Example 1, either in its purified or unpurified condition, may be halogenated by contacting it with free halogen. By contacting the compound with free halogen I believe that initially there is an addition of two halogen atoms and that such addition occurs at the nitrogen to carbon double bond apparently present in that compound so that one bond of that double bond is replaced by a halogen on that nitrogen and a halogen at that carbon. Where additional halogenation occurs I believe that halogen replaces some of the hydrogen atoms thereof because I have halogenated said compounds to the extent of hex-halogens by contacting them with free halogen. Broadly, I may halogenate said reaction product by treating it with a solution of the desired halogen such as bromine in alcohol, iodine in alcohol or with fluorine or chlorine added directly to an alcohol solution of the reaction product to provide halogen derivatives thereof.

The following are examples given merely for the purpose of illustrating methods of producing a specific halogenated compounds without in any way limiting the invention, all parts being given by weight unless otherwise specified.

*Example 2*

Approximately 10 to 15 grams of Product A was put in a large beaker with 100 cc. of ethyl alcohol. Bromine in solution in ethyl alcohol was added in small increments to the above mixture at room temperature. As the bromine solutions were being added to the said Product A, reaction took place and the bromination product of Product A passed into a colorless solution in the alcohol. When all of said Product A has become brominated, excess bromine colors the alcohol and serves as an indicator showing the completion of the reaction. After allowing to stand at room temperature for 2 or 3 days, precipitation occurred in crystals which were filtered and recrystallized from alcohol twice. Analysis of the resultant crystalline bromination product indicated a di-bromine product of Product A; that is to say, said Product A having 2 bromine atoms added thereto.

*Example 3*

Approximately 10 to 15 grams of Product A was placed in a large beaker and covered with 200 cc. of alcohol. Chlorine was bubbled into said mass until substantially complete solution took place due to the chlorination of Product A. The mass was then allowed to stand for 3 to 4 days at room temperature whereupon precipitation took place. The crystals were separated from the liquid phase by filtration and recrystallization twice from alcohol. Analysis of the resultant crystalline chlorinated product indicated a hexa-chlorinated derivative of Product A and it appeared that 2 chlorine atoms were added to Product A and 4 chlorine atoms were substituted for 4 of the hydrogen atoms thereof.

*Example 4*

Following the same procedure as that of Example 2, except that iodine is substituted for bromine. Because the iodine reaction is more difficult than either that when bromine or chlorine is used, in this case a small amount of mercury nitrate was added to speed up the reaction. Analysis of the resultant crystalline product indicated that the di-iodide derivative had been produced and it appeared that two iodine atoms had been added to Product A.

*Example 5*

Following the same procedure as that of Example 3, except that fluorine was substituted for the chlorine. Analysis of the resultant crystalline product indicated that the di-fluoride derivative had been produced and it appeared that 2 fluorine atoms had been added to Product A.

Instead of bubbling a large amount of chlorine into said mass as in Example 3, the amount of chlorine may be controlled in order to control the degree of chlorination of Product A. For example, if only a di-chloride is desired, then the amount of chlorine bubbled into said mass is approximately equal in moles to the moles of Product A in said mass. Moreover, instead of employing equal molecular proportions of chlorine to Product A in the mass, one may bubble into said mass 2 moles of chlorine for each mole of Product A in said mass to produce the tetra-chlorine derivatives of Product A.

*Example 6*

Approximately 20 grams of Product A was placed in a large beaker and covered with 250 cc. of alcohol. Then there was added thereto an alcohol solution of bromine. The bromine solution was carefully and slowly added until an excess of bromine became evident. The entire mass was poured into about twice its volume of water whereupon the bromine derivatives are thrown out in the form of crystals. The crystals were separated from the liquid phase of the mass and were analyzed and the analysis indicated that the crystalline product was a di-bromine derivative of Product A, indicating that 2 atoms of bromine were added to Product A.

In order to facilitate halogenation of more than one molecular equivalent, heat and pressure may be employed. In general, in order to obtain a rapid halogenation of Product A whereby more than 1 mole of halogen is combined with Product A, I prefer to carry out the halogenation in a closed unit, to employ temperatures of approximately 100° C. and pressures up to 100 lbs. per sq. in. The halogenation of Product A to obtain compounds in which 2 halogens have been combined with Product A and 1 to 4 other halogens have been substituted for the hydrogens thereof, may be accomplished by following the procedure set forth in the following example:

*Example 7*

10 to 20 grams of Product A is combined with 200 grams of ethyl alcohol and to this is added 1 to 3 moles of chlorine, bromine, iodine or fluorine for each mole of Product A. While being constantly agitated, the mass is maintained at approximately 100° C. and a pressure of approximately 50 to 100 lbs. per sq. in. for about ½ hour in a closed container. The pressure and temperature are reduced to normal and the resultant halogenated product is separated from the alcohol. This product, upon analysis, will be found to contain from 2 to 6 atoms of the halogen employed combined with 1 mole of Product A with 2 moles thereof being added directly to Product A and the 1 to 4 atoms substituted are replacing 1 to 4 hydrogen atoms of Product A.

*Example 8*

Product A may be reacted with a hydrogen halide compound to provide the mono-halogen derivatives thereof. For this purpose 10 to 20 grams of Product A are dissolved in 200 cc. of ethyl alcohol. To this solution is added 1 molecular equivalent of hydrogen halide and the temperature is increased to 100° C. and maintained for approximately 20 minutes at this temperature in a closed vessel. Then the mass is allowed to cool to room temperature and the alcohol separated therefrom. The derivative thus obtained will contain 1 additional atom of hydrogen and 1 atom of the halogen coupled with Product A. The empirical formula of the resultant compound is $C_7H_{13}N_2SX$ in which X is a halogen. I believe that the 1 bond of the apparently present double bond between a carbon and nitrogen is replaced by a hydrogen and the halogen of the particular hydro-halide employed which may be HCl, HBr, HF of HI. This compound may be further halogenated to substitute 1 to 5 halogens for 1 to 5 of the hydrogen atoms thereof. This may be done by following the general procedure set forth in Example 9 and employing ½ to 1½ moles of halogen for each mole of hydro-halogenated compound herein.

*Example 9*

The hydrogenated Product A may also be halogenated to any desired degree. In general this may be accomplished by making up a mass of 10 to 20 grams of hydrogenated Product A in 200 grams of ethyl alcohol. This mass is placed into a closed unit to which is added ½ to 3 moles of chlorine, bromine, iodine or fluorine for each mole of said hydrogenated Product A therein. While being constantly agitated the combination of hydrogenated Product A, alcohol and halogen is maintained at a temperature of approximately 100° C. and a pressure of 50 to 100 lbs. per sq. in. for about 20 to 30 minutes. Then the pressure is reduced to atmospheric and the temperature reduced to room temperature and the resultant halogenated product is separated from the alcohol. The resultant halogenated product is the hydrogenated Product A having from 1 to 6 hydrogen atoms thereof replaced by one of said halogens.

All of the various halogenated products herein, examples of which are Examples 2 to 9, may be substituted to provide a wide variety of other derivatives. For example, they may be treated with alkali cyanide such as NaCN to replace either one or all of the halogen atoms to provide cyanide derivatives. For example, the bromine derivatives may now be dissolved in alcohol and to this solution is carefully added an alcohol dispersion of NaCN. The mixture is warmed over an extended period of time, say several hours, whereupon there is a reaction converting the bromide to cyanide compounds.

The halogen derivatives may be treated with an aqueous solution of an alkali hydroxide, such as sodium hydroxide, potassium hydroxide, lithium hydroxide, etc. to substitute OH groups in place of the halogens; they may be treated with a solution of sodamide to replace one or all of the halogens with an $NH_2$ group. These various substituted derivatives may in turn serve as intermediates for the production of other compounds. For example, the cyanide derivatives may be hydrolyzed by the use of weak aqueous solution of an acid, such as HCl to convert them to the carboxyl derivatives, in this manner each CN group is converted to COOH; the hydroxy derivatives may be converted to the metal salts by the use of metallic sodium, for example, to replace the H of each OH group with sodium or by the use of any other appropriate reactant for replacing such hydrogen atoms with the metal desired depending upon the metal derivative required.

The last named derivatives may in turn serve as intermediates for the production of still other novel compounds. The carboxyl derivatives may be reacted with a wide variety of compounds for the production of various salts and esters thereof whereby the H of each COOH is replaced with a desired metal, such as cobalt, nickel, copper, manganese, etc. or any desired organic group such as a hydrocarbon group such as $CH_3$, $C_2H_5$ etc.

All the aforementioned derivatives of the starting material as well as the starting Compound A may be hydrogenated to convert the ketone group (CO) to an alcohol group (COH) which in turn may have the H of the COH replaced with any desired metal such as sodium or potassium.

Also according to this invention, one or a combination of two or more of the novel products of this invention, namely Product A and the derivatives thereof, and particularly certain of the metal derivatives are combined with an animal feed which of course may vary in its composition depending upon the particular class of animals to be fed and serve as growth stimulants and sometimes as therapeutic agents, and act somewhat similar to vitamins especially when fed to poultry. In most cases, according to this invention, the animal feed has added thereto a quantity of one or more of said products in small amounts so that the resultant feed contains a minor proportion of said reaction products and no more than 25% and generally from .001 to 1% by weight of said reaction product depending upon the manner of feeding to be used.

A convenient method that I have employed in the practice of this phase of my invention is to disperse one of said products in purified and finely ground condition as an additive to the normal animal feeds employed either as a sole or part ratio for the animals to be fed. The particular novel product, either alone or in combination with each other, may be dissolved in a small amount of hot alcohol and the resultant solution may be dispersed in any convenient manner in the feed and the feed dried to drive off the solvent. If desired, these compounds may be mixed directly into the feed. Also they may be dispersed in any of the edible oils such as coconut, olive, cottonseed or the like and the resultant mixture may be dispersed in the solid particles of the feed. Any of the commercial or "farm mixed" feeds may be employed as carriers of these compounds. The feeds to which such compounds are to be added generally stated contain a quantity of grains, sometimes in the ground form, meat or other protein substitute, minerals and vitamins sufficient to furnish an adequate diet to suit the requirements of the animals to be fed.

The halogen derivatives particularly also find application as fungicides; also they may be milled into rubber, natural or synthetic such as polymerized chloroprene, homopolymerized butadiene, copolymers of butadiene and styrene, copolymers of butadiene and acrylonitrile to improve the ageing characteristics thereof and for this purpose I employ 1 to 5 parts by weight of one or a combination of two or more of said halogen derivatives for 100 parts of rubber or synthetic rubber; also they may be reacted with hydrogen peroxide by warming a mixture of a halogenated derivative together with an aqueous solution of hydrogen peroxide, then allowing to stand at room temperature. The resultant reaction product may be combined with alkyd resins to modify them.

It is understood that the following claims are intended to cover all the generic and specific features of the invention herein described and all statements of the scope of the invention which as a matter of language might be said to fall therebetween; and that they are intended to be inclusive in scope and not exclusive, in that, if desired, other materials may be added to my novel composition of matter herein claimed without departing from the spirit of the invention. Particularly it is to be understood that in said claims, ingredients or components recited in the singular are intended to include compatible mixtures of said ingredients wherever the sense permits.

This application is a continuation-in-part of my copending application Serial No. 228,370, filed May 25, 1951, and now abandoned.

Having thus described my invention, what I claim is:

1. The method for halogenating a reaction product of thiourea and diacetone alcohol and having an empirical formula $C_7H_{12}N_2S$ comprising contacting said product with a free halogen to combine therewith 2–6 atoms of halogen per mole thereof, said thiourea diacetone alcohol reaction product obtainable by reacting 1 mole of thiourea with 1 mole of diacetone alcohol in the presence of HCl catalyst.

2. The method of halogenating a hydrogenated thiourea and diacetone alcohol reaction product having the empirical formula $C_7H_{14}N_2S$ comprising contacting said product with a free halogen to combine therewith 2–6 atoms of halogen per mole thereof said hydrogenated compound obtainable by hydrogenating thiourea-diacetone alcohol reaction product obtainable by reacting 1 mole of thiourea with 1 mole of diacetone alcohol in the presence of HCl catalyst.

3. The method for halogenating a hydrohalogenated reaction product of diacetone alcohol and thiourea having the empirical formula $C_7H_{13}N_2SX$ in which X is a halogen, comprising contacting said product with a free halogen to combine therewith 2–6 atoms of halogen per mole thereof, said hydrohalogenated compound being hydrohalogenated thiourea-diacetone alcohol reaction product, with the thiourea-reaction product obtainable by reacting 1 mole of thiourea with 1 mole of diacetone alcohol in the presence of HCl catalyst.

4. A product made according to claim 1.

5. A product made according to claim 2.

6. A product made according to claim 3.

7. The method for halogenating a material selected from the group consisting of (a) a reaction product of thiourea and diacetone alcohol and having empirical formula $C_7H_{12}N_2S$, (b) hydrogenated (a) having empirical formula $C_7H_{14}N_2S$, (c) hydrohalogenated (a) having empirical formula $C_7H_{13}N_2SX$ in which X is a halogen atom, comprising contacting said material with a free halogen to combine therewith 2–6 atoms of halogen per mole thereof, said thiourea-diacetone alcohol reaction product obtainable by reacting 1 mole of thiourea with 1 mole of diacetone alcohol in the presence of HCl catalyst.

8. A product made according to claim 7.

References Cited in the file of this patent

UNITED STATES PATENTS 2,234,848    Ter Horst _____ Mar. 11, 1941